United States Patent

[11] 3,617,427

[72] Inventor John R. Le Blanc
  Wilbraham, Mass.
[21] Appl. No. 852,396
[22] Filed Aug. 22, 1969
[45] Patented Nov. 2, 1971
[73] Assignees Alton Box Board Company
  Alton, Ill.;
  Monsanto Company
  St. Louis, Mo.

[54] CORRUGATED FIBERBOARD
  5 Claims, 2 Drawing Figs.
[52] U.S. Cl. ........................................ 161/133,
  117/155, 156/210, 161/263
[51] Int. Cl. ........................................ B32b 3/38,
  B32b 9/06, B32b 29/06
[50] Field of Search........................................ 117/155;
  156/210; 161/133–137, 263, 264; 229/6; 260/840

[56] References Cited
UNITED STATES PATENTS
2,711,961 6/1955 Bruner ........................ 117/155 X
3,431,162 3/1969 Morris........................ 161/133

Primary Examiner—William A. Powell
Attorneys—John W. Klooster, Arthur E. Hoffman, Richard W. Sternberg and Neal E. Willis ABSTRACT: Corrugated fiberboard which resists deterioration in strength when in the presence of moisture or water, and intermediate resin treated medium and liner sheet members useful in the manufacture thereof. Such board is made by treating medium and, optionally, liner members with an aminoplast modified phenol aldehyde resole resin composition and thereafter bonding corrugated medium to liner members with a thermosetting waterproof adhesive system.

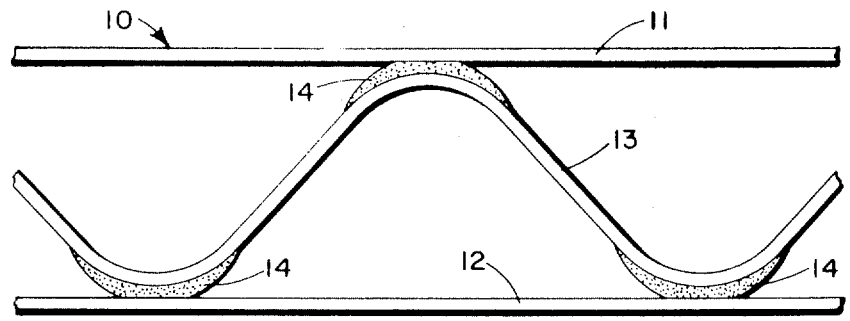
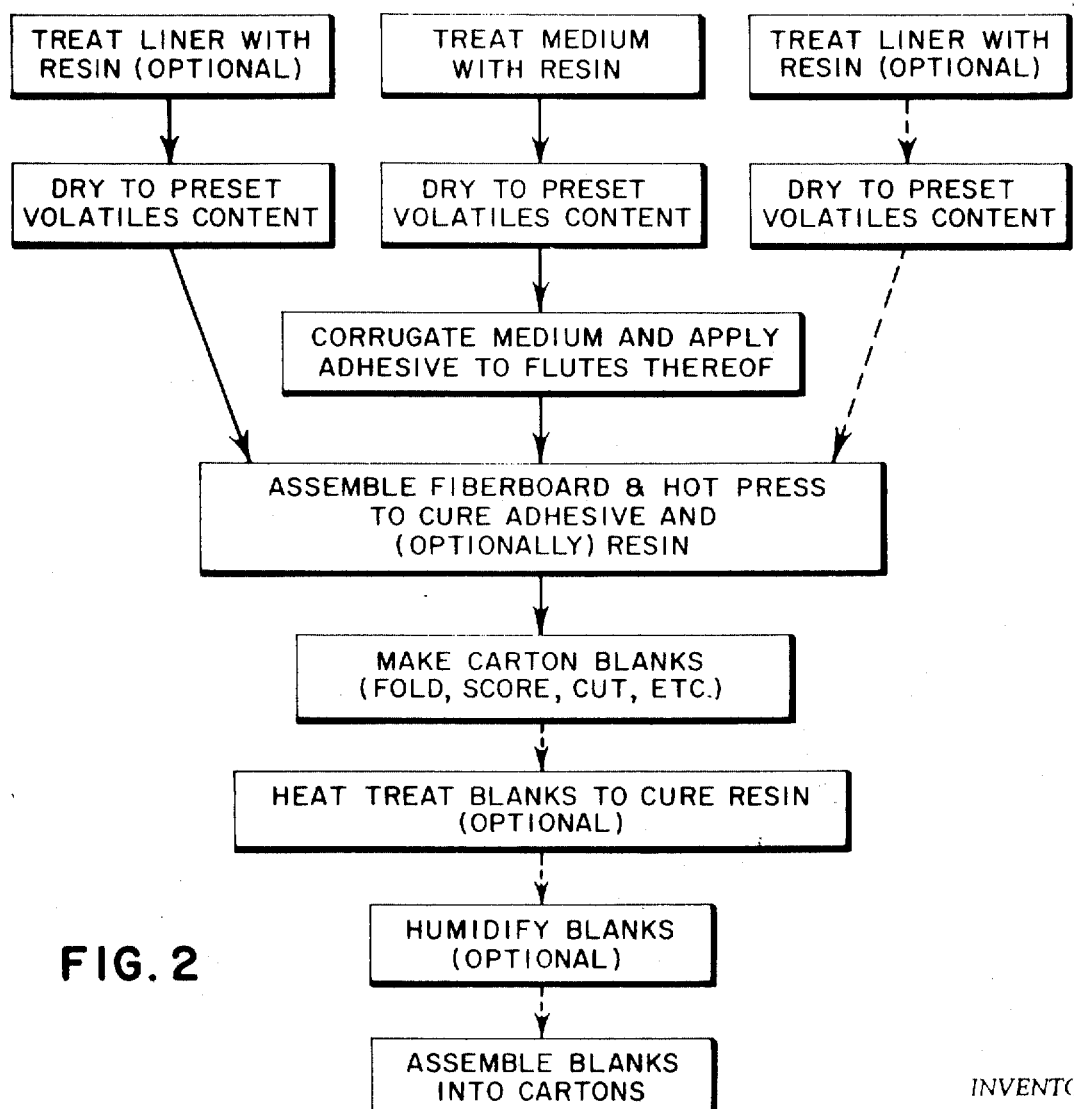

CORRUGATED FIBERBOARD

BACKGROUND

Corrugated fiberboard has been used for many years and for various purposes, but is well known to have poor wet strength properties. However, for some time, manufacturers of corrugated fiberboard have tried to remedy such inherent deficiencies in wet strength (as determined, for example, using postmoisture exposure crush resistance comparative measurements) by impregnating the paper sheeting used in making such board with various polymeric substances including phenolic resins. So far as is known, however, such efforts have not been successful in producing corrugated fiberboard of commercially useful quality; see, for example, Koning, Jr. and Fahey of the U.S. Forest Products Laboratory reported in "Package Engineering," Vol. 10, No. 10, Oct. 1965, at pages 130 through 139.

Such previous efforts to improve wet strength using phenol-aldehyde resins have generally not been successful because of a variety of problems, such as:

A. the prolonged and excessively high temperatures required for phenol-aldehyde resin curing (preventing the use in effect of phenolic resins on the high-speed machinery conventionally commercially used to make corrugated fiberboard);

B. the inability of conventional aqueous phenol-aldehyde resin systems to uniformly penetrate base paper stock during high-speed treating;

C. the embrittlement and even partial decomposition commonly associated with paper stock following phenol-aldehyde resin treatment and incorporation into corrugated fiberboard;

D. the lack of compatibility and good bonding between phenol-aldehyde thermoset resin treated base stock and adhesive systems used to bond such resin treated medium and liner sheets together into corrugated fiberboard; and the like.

It has surprisingly and unexpectedly now been discovered that each of such prior art problems can be overcome when a particular aminoplast modified phenol-aldehyde resin system and a particular adhesive system are used in conventional high-speed manufacturing equipment to make corrugated fiberboard having among other desirable properties generally superior postmoisture exposure crush resistance.

A significant advantage associated with the present invention is that the resin system used for impregnation of the base paper stock used in such fiberboard manufacture thermosets at significantly higher temperatures using shorter times than those needed to thermoset the adhesive system employed, thereby making it possible if desired to maximize wet strength in a product carton blank to first cure the adhesive used to make the board, then form the blank from the board, and finally cure the resin in the paper used to make the board rather than curing adhesive and resin in board manufacture. Consequently, one can, if desired, first manufacture corrugated fiberboard having good dry strength and flexibility characteristics, such as are desirable in further machine processing of corrugated fiberboard into manufactured articles like box blanks, etc., and then process such fiberboard into such manufactured articles. Thereafter, the impregnated resin can be thermoset, and the resulting corrugated fiberboard accordingly stiffened and rigidified by raising the so-manufactured articles to temperatures high enough to thermoset such impregnated resin.

It is during this last heating (thermosetting) step that another significant advantage of our invention is appreciated. The particular resin employed in this invention thermosets to rapidly that the desired, normal, inherent moisture content of corrugated fiberboard is not depleted or reduced to the point where the product board is excessively and even permanently embrittled, which was a common fault with prior art treating resins.

Other and further advantages will be apparent to those skilled in the art from the present teachings.

SUMMARY

The present invention relates to a novel corrugated fiberboard construction adapted to have good wet strength, and to certain novel resin treated medium and liner sheet members useful as intermediates for the manufacture of such fiberboard. For purposes of the present invention, wet strength of corrugated fiberboard is conveniently measured comparatively using flat crush resistance data before and after moisture exposure by means of ASTM Test Procedure No. D-1225-D)

An intermediate sheet member of this invention which is adapted for use as a medium in the manufacture of corrugated fiberboard utilizes a paperboard ranging in thickness from about 7 to 15 thousandths of an inch and having a grade weight of from about 25 to 36 pounds per 1,000 sq. ft.

Such a paper has been treated with from about 5 to 15 weight percent total (dry weight basis) of a phenol-aldehyde resin system which is chemically modified with an aminoplast. The paper after such resin system treatment has a total volatiles content of from about 5 to 10 weight percent.

The terms "treated," "treating," or "treatment" as used herein is generic to both impregnation and coating of the substrate paper itself; such can be accomplished in any convenient, conventional manner, as hereinafter further detailed and illustrated.

An intermediate sheet member of this invention which is adapted for use as a liner in the manufacture of corrugated fiberboard utilizes a paperboard ranging in thickness from about 5–20 thousandths of an inch and having a grade weight of from about 55 to 120 pounds per 1,000 sq. ft.

Such a paper has been treated with from about 2 to 10 weight percent (total dry weight basis) with such a modified phenol-aldehyde resin system and said paper after such treatment has a total volatiles content of from about 5 to 10 weight percent.

Liner sheet members used in the novel corrugated fiberboard constructions of this invention need not be, but preferably are, treated with such a modified phenol-aldehyde resin system.

A corrugated fiberboard construction of this invention employs a treated medium, as above described, and a liner (preferably, though not necessarily, a treated one, as above described). Each such medium is corrugated and positioned adjacent to a liner member on one side thereof (preferably there is a liner in each side of a corrugated medium). Each liner is bonded to its adjoining medium at positions of mutual contact therebetween with an adhesive which is interposed between such a liner sheet member and such a medium sheet member at such positions of mutual contact (typically the tips of the corrugated medium flutes).

The aminoplast modified phenol-aldehyde resin system used comprises on a dry total weight basis from about 95 to 99.5 weight percent of an aminoplast modified phenol-aldehyde resole resin which is (at the time of paper treatment) substantially completely soluble in water, and, correspondingly, from 0.5 to 5 weight percent of an ammonium salt of a mineral acid.

In preparing such a resin system for use in this invention, one can use any known aminoplast modified phenol-aldehyde resin. The term "aminoplast" as used herein has reference to one or more compounds selected from the group consisting of dicyandiamide, melamine, and urea. Dicyandiamide is preferred.

Aminoplast modified phenol-aldehyde resins suitable for use in this invention may be made, for example, by techniques taught by Mestdagh et al. in U.S. Pat. No. 3,004,941. Aminoplast modified resins of phenol and formaldehyde are preferred.

Thus, such a modified phenol-formaldehyde resin usable in this invention can be prepared by first condensing from about 1.5 to 5 mols of formaldehyde per mol of phenol.

Preferentially, the condensation is accomplished using an alkaline catalyst. The condensation is continued until a predetermined free formaldehyde content is reached, as determined, for example, by the hydroxylamine hydrochloride test. A suitable free-formaldehyde content is about 9–15 weight percent based on total weight of starting reactants. The formaldehyde used in the starting reactants can be in the ratio range of about 1.5 to 5 mols per mol of phenol, and, preferably, ranges from about 1.5 to 3.5 mols of formaldehyde per mol of phenol. Such aqueous condensation product of phenol and formaldehyde, having the excess formaldehyde, is cooled to about 30° to 50° C. The aminoplast (dicyandiamide, melamine, or urea, or mixture thereof) is then added in such a proportion that the ratio is generally, and, preferably, about 1 mol of the aminoplast to about 0.5 to 2.0 mols of formaldehyde in the resulting formaldehyde condensation product with dicyandiamide, melamine, and/or urea and, more preferably, about 1.2 to 1.6 mols of formaldehyde. For example, when employing a mixture of dicyandiamide, melamine, and urea, the mixture can consist of from about 10 to 90 weight percent of dicyandiamide, and, correspondingly, about 90 to 10 weight percent of urea.

Alternatively, the process for preparing an aminoplast modified phenol-formaldehyde resin for use in this invention can be accomplished by reacting dicyandiamide, melamine, or urea, or mixture thereof, with formaldehyde in the presence of an alkaline catalyzed reaction product of phenol-formaldehyde having no excess free formaldehyde. This process can be initiated by first reacting phenol with formaldehyde under alkaline catalyzed conditions to provide a water-dilutable condensate of phenol-formaldehyde having no free formaldehyde. The ratio of formaldehyde to phenol, and of aminoplast to formaldehyde remains as above indicated.

Other methods known to the art can be used for preparing such a modified resin for use in this invention. Typically, such methods involve the separate preparation of a phenol-aldehyde condensate resin composition which is initially not only water soluble but also water dilutable to the extent desired. The dicyandiamide, melamine and/or urea formaldehyde condensation product, as those skilled in the art readily appreciate, can be prepared separately by conventional techniques in the form of a resin which is typically not only water soluble, but also water dilutable to the extent desired. Such a separately prepared formaldehyde condensation product with dicyandiamide, melamine or urea can have a mol ratio of dicyandiamide melamine and/or urea to aldehyde of from about 0.5 to 5. The resin is then added to the preformed phenol-aldehyde resin. Preferably, aminoplast modified phenol-aldehyde resins for use in this invention have a total combined nitrogen content ranging from about 3 to 15 weight percent (dry weight basis), and, in general, this nitrogen content is less than about 25 weight percent.

It is to be noted that, in a resin composition for use in this invention, the chemical composition of such an aminoplast phenol-aldehyde resin can itself vary. For example, although during the reaction of the condensates, the phenol, the dicyandiamide, the melamine, and/or the urea will preferentially react with the aldehyde, it is expected that certain other reaction products will also form during the condensation reaction. These products would be, for example, a phenol-dicyandiamide-formaldehyde reaction product. When employing a mixture of dicyandiamide and urea, a phenol-dicyandiamide-urea-formaldehyde reaction product can form as well as a mixture of phenol-dicyandiamide-formaldehyde, phenol-dicyandiamide-urea-formaldehyde and phenol-urea-formaldehyde reaction products. It is understood that these reaction products would only exist in minor amounts with the predominant portion of the condensation reaction products being phenol-formaldehyde and dicyandiamide-formaldehyde, or mixtures of dicyandiamide-formaldehyde and urea-formaldehyde. In general, the preparation of aminoplast modified phenol-aldehyde is known to those skilled in the art and does not form a part of the present invention. As those skilled in the art will appreciate, the aminoplast modified phenol-aldehyde resins used in the present invention are of the resole type since not only is the phenol-aldehyde condensation conducted under basic catalysis conditions, but also the aminoplast modification thereof is conducted under basic catalysis conditions.

As indicated above, the aminoplast modified phenol-aldehyde resole resin system and the ammonium salt are substantially completely dissolved in water at the time of paper treatment to make products of this invention. Minor amounts, say up to 5 or 7 weight percent of each such material may not be truly dissolved (especially in concentrates) but such deviations are within the contemplation of this invention in the word "substantially."

The aminoplast modified resin used is conveniently and preferably prepared as a concentrate of from about 40 to 55 weight percent resin solids (based on total resin solutions weight). This concentrate is conveniently and preferably diluted down before use to a resin solids content of from about 5 to 50 weight percent. After the ammonium salt is added to and dissolved in the working solution, the solids content of a concentrate can range from about 45 to 60 weight percent typically and preferably the solids content of a diluted working solution ranges from about 15 to 45 weight percent.

For use in the present invention, it has been found that an aminoplast modified resin as described above should not be advanced in manufacture beyond a point where it has a water solubility such that about a 55 weight percent solids content aqueous solution thereof can be prepared (preferably about 30 percent). Preferably, this aminoplast modified resin has a methylol content per aromatic ring of from about 0.5 to 3 (more preferably from about 1 to 2.5) as determined, for example, by NMR measurements. If such resin is more advanced (i.e. has a high molecular weight) than such a solubility as above indicated, or if such resin has a different methylol content than that above indicated, then it appears to have undesirable paper-treating characteristics, especially at the high application speeds conventionally employed for paper transport in the manufacture of corrugated fiberboard, for purposes of making the improved products of this invention.

As indicated above, any ammonium salt of a mineral acid can be used in the present invention. Examples include ammonium halides (ammonium chloride preferred), ammonium nitrate, ammonium sulfate, ammonium phosphate and the like.

It is generally convenient and preferred to add the ammonium salt in the respective amounts above indicated to the solution of aminoplast modified resin in the form of a finely divided powder or, more preferably, already dissolved in water. It is preferred that at the time of use the ammonium salt be substantially completely dissolved in the working solution. Preferably, the ammonium salt is not added to the resin solution until shortly before a medium or liner sheet member is to be treated therewith.

The adhesive used to bond medium member to liner member in accordance with the teachings of this invention is one selected from the group consisting of phenol-starch-formaldehyde adhesives, resorcinol-starch-formaldehyde adhesives, urea-starch-formaldehyde adhesives, and aminoplast modified phenol-formaldehyde starch adhesives. In general, such adhesive systems are well known to the art and when thermoset are substantially water insoluble (e.g. paper does not delaminate after being bonded together with such an adhesive system following exposure to water). Such adhesive systems for use in the present invention preferably have cure times not less than about 15 seconds at 170° C. An advantage of such adhesive systems from the standpoint of utilization in the present invention is that they characteristically display quick tack properties which make them suitable for corrugated fiberboard manufacture on high-speed equipment. Such adhesive systems are also compatible with the aminoplast-modified resin system above described, and coact therewith in accordance with this invention to produce corrugated fiberboard having superior flat crush resistance after moisture exposure.

Such an adhesive system is at the time of use to make corrugated fiberboard of this invention in the form of an aqueous dispersion or mixed aqueous dispersion, aqueous solution, and aqueous dispersion/solution mixture having a total solids content of from about 15 to 30 weight percent (based on total system weight). Typical viscosities range from about 200 to 8,000 centipoises and typical gel points range from about 130° to 160° F.

One class of adhesive systems which is preferred for use in the present invention is resorcinol-starch-formaldehyde adhesives. Typically such an adhesive system contains at least about 1 weight percent (based on total adhesive system solids) of combined formaldehyde, typically the average number of combined mols of formaldehyde per mol of material selected from the group consisting of phenol, resorcinol, urea, melamine, and dicyandiamide, ranges from about 1.0 to 2.9, and typically such a system contains about 70 weight percent of starch (based on total adhesive solids). Variations, of course, are possible without departing from the spirit and scope of this invention.

Methods for preparation are given in such references as U.S. Pat. Nos. 2,884,389; 3,294,716; and 2,886,541. Commonly, a supplier provides such an adhesive as a one or a two tank formulation, which, in the latter case, are combined before use and typically are further diluted with water. before As those skilled in the art will appreciate, in the art of corrugated fiberboard, it has been conventional to employ as the medium sheet member either a Kraft paper or jute paper. A corrugated medium member is formed by running a continuous sheet of medium through corrugating rolls. The medium, or "9 point" as it is sometimes called, takes on a wavelike shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1,000 sq. ft. having a thickness of about 0.009 inch for all grades of combined board, but for purposes of the present invention, may be heavier or lighter for special requirements. Corrugating medium, for example, is most commonly made from "semichemical" pulp but is also made from straw, craft, bogus, or chip (mixed, repulped fibers).

There are four conventional or standard sizes of corrugations as follows:

TABLE 1

| Designation | Number of Flutes per foot (approximate) | Thickness of Single Wall Board¹, in. |
|---|---|---|
| A | 33–39 | 0.185–0.210 |
| B | 47–53 | 0.097–0.105 |
| C | 39–45 | 0.139–0.145 |
| D | 90–97 | 0.045–0.0624 |

¹ Approximate, depending on thickness of facings and also the particular corrugating rolls.

As with medium sheet members, any conventional liner sheet member can be used in the manufacture of the corrugated fiberboard of the present invention. Generally, the liner sheet members are made from sulfate Kraft, but sometimes are made from other pulps.

Kraft for liner sheet members is usually made on a Fourdrinier machine although some is made on a cylinder machine. Commonly, liner sheet members are made to standard weights which are 26, 33, 38, 42, 47, 62, 69, and 90 pounds per 1,000 sq. with thicknesses for liner sheet members ranging from 0.009 inch to 0.025 inch.

Details on the characteristics of medium sheet members and liner sheet members are well known to the corrugated fiberboard manufacturing industry. See, for example, Uniform Freight Classification Rule 41. The corrugation flutes can be combined using adhesive with a facing or liner sheet member on one side only, called a single face board; when facings are on both sides of the corrugated medium sheet member, the product is sometimes called single-wall board or double-face board. If there are two sheets of flutes with a facing on each side and one in the middle, the product is sometimes called double-wall board. If there are three layers of flutes with two outer liner facings and two inner liner facings between media layers, the product is sometimes called triple-wall board.

The ammonium salt is conveniently not added to the resin treated solution until shortly before a medium or liner sheet member is to be treated therewith and such salt is conveniently added thereto in a previously aqueous solution form.

The medium and liner can be treated with a resin system by immersion or any other convenient coating techniques. In a product corrugated fiberboard, only the medium need be resin treated, but preferably, both liner and medium sheet members are resin treated. For example, in liner treatment, a preferred method involves surface coating rather than immersion impregnation. Suitable coating procedures involve application to one surface of a liner with a brush, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat medium sheet members with a resin system.

After treatment, a medium or liner sheet member is dried by passing such over or through a hot zone such that the temperature of the liner and/or the medium does not exceed about 225° F. for more than about 0.1 second so as to avoid thermosetting the resin system. In drying, water is substantially completely removed without appreciable advancement or curing of the resin impregnated into the liner or medium sheet member. Thus, the percentage of volatiles in a treated liner or medium is controlled within the ranges above indicated. For example, if the percentage of volatiles is reduced below such range, the resin system tends to cross-link and subsequently during corrugated fiberboard production reduced adhesive bonding to such a resin cross-linked medium or liner sheet tends to result, among other undesired results. On the other hand, for example, if the percentage of volatiles is left appreciably above such range, reduced adhesive bonding can likewise result. Also, outside of these ranges, a treated medium may be difficult to corrugate. Next, if not stored intervenigly, a treated medium and a liner member are combined together. Commercially, a conventional combining machine may be used for this operation.

In general, the adhesive used is prepared just prior to the time of use by a fiberboard manufacturer or it is prepared by a supplier to him. Commonly, a supplier provides the adhesive as a one tank or two tank formulation, which is combined in the case of two tanks, and which is typically further diluted with water before actual application. Although an adhesive is generally discontinuously but automatically applied only to the flutes of a corrugated treated medium when using machinery to make corrugated fiberboard of this invention, typical machine adhesive application rates range from about 3 to 12 pounds adhesive solids per 1,000 sq. ft. of product corrugated fiberboard but more or less than this amount can be employed. Adhesive application rates are not critical and can be widely varied without departing from the spirit and scope of this invention.

After adhesive application, corrugated medium sheet member(s) and liner sheet member(s) are duly combined together, as in a so-called combining machine, into board, the resulting fiberboard construction is subjected to temperatures of from about 320° to 450° F. for times of from about 5 seconds to 10 minutes to complete manufacture. Afterwards, the product board can be rolled up in a storage configuration, as is commonly done in continuous corrugated fiberboard manufacture. Preferred temperatures for heating the combined corrugated medium sheet and liner sheet member(s) involve the use of temperatures of from about 320° to 370° F. applied for times of from about 5 to 15 seconds. Such preferred heating temperatures and times substantially completely thermoset the adhesive, but not the resin, thus bonding together the medium and liner sheet members at positions of mutual contact therebetween, thereby to form a desired corrugated fiberboard. When only the adhesive is thermoset, the product fiberboard is generally more limber and pliable than when the resin is thermoset, which is desirable when the fiberboard product is to be made into box blanks.

Preferably, a corrugated fiberboard construction of this invention is equipped with at least a pair of such liner sheet members so that such a preferred construction has its opposed faces composed of liner sheet members with a resin treated medium sheet interposed therebetween (and bonded by means of such adhesive, as indicated).

Usually, and conventionally, a corrugated fiberboard of this invention is promptly made into box blanks following manufacture, though it is possible and convenient to store the corrugated fiberboard before same is used to make box blanks. Box (or carton) blank manufacture is well known to those of ordinary skill in the art and does not form part of this invention. When corrugated fiberboard is directly converted into box blanks, it is conventional to place at the end of a combining machine knives which cut the corrugated fiberboard into the lengths required by the particular box to be made. Next, the resulting piece of board is scored longitudinally, so as to permit folding such board to make the top and bottom flaps of a box. In this operation, the sheet of fiberboard product is also longitudinally edge trimmed to an exact predetermined width. In some modern machines, during the operation of scoring longitudinally, the longitudinal edge trimming is performed before the corrugated fiberboard continuous sheet is cut to length for individual box blanks.

The next operation usually accomplished three functions: The sheet is trimmed transversely to a desired length, three slots with connecting score lines are cut on both sides of the sheet to form the individual top and bottom flaps, and any desired printing is applied to the surface (usually exteriorly).

Finally, in a fourth operation, the product box blank is folded so that the two ends come together and are then joined by taping, gluing, or stapling. This flattened "tube" can then be opened up into box form, the bottom flaps folded closed and sealed, the contents placed inside, and the top flaps folded and sealed.

If the corrugated fiberboard used to make the blanks does not have its resin treated medium and (optionally) liner members thermoset, a final blank processing step is preferably performed. Thus, in such event, usually before a blank (such as a flattened tube) is opened into box form, but after folding, scoring, slotting, and related operations are completed, a resulting carton blank is heated to a temperature and for a time sufficient to substantially completely thermoset the phenol-aldehyde resin system impregnated into the medium and (optionally) liner members of the board. In general, suitable temperatures for this purpose range from about 320° to 450° F. applied for times ranging from about 2 to 10 minutes (with higher temperatures requiring shorter cure times). Such a thermosetting increases the water resistance properties (e.g. crush resistance, as indicated above) of the product fiberboard and blank made therewith.

DESCRIPTION OF DRAWINGS

The invention is better understood by reference to the attached drawings wherein:

FIG. 1 is an enlarged, diagrammatic vertical cross-sectional view, some parts thereof broken away, of one embodiment of a corrugated fiberboard construction of this invention, and FIG. 2 is a simplified flow sheet illustrating the method of making corrugated fiberboard in accordance with the teachings of the present invention.

Turning to FIG. 1, there is seen a corrugated fiberboard construction of the present invention which is designated in its entirety by the numeral 10. Construction 10 is seen to incorporate a pair of facing liner sheet members 11 and 12. Interposed between liner sheet members 11 and 12 is a corrugated medium sheet member 13. The liner sheet members 11 and 12 are optionally treated with a phenolic resin as taught herein above, while the medium sheet member 13 is treated with an aminoplast modified phenolic resin as taught hereinabove.

The tips of the flutes in the corrugated medium 13 are bonded to the adjacent faces of respective liner members 11 and 12 by means of a starch/formaldehyde adhesive system 14 as taught herein. Conventionally, the adhesive 14 is applied to the tips of the flutes during the combining operation of the medium 13 and the liners 11 and 12. After assembly, the construction 10 is heated as above described to thermoset the adhesive 14 and produce the corrugated fiberboard 10.

Steps in one embodiment of a process for making a fiberboard 10 are shown in FIG. 2. This block diagram is believed to be largely self-explanatory particularly in view of the foregoing description so no detailed explanation thereof is given herein. Observe that FIG. 2 merely illustrates one mode of practicing the present invention and that deviations and variations in accordance with the teachings of the present invention are possible without departing from the spirit and scope of this invention.

The machine used to make corrugated fiberboard usually combines into a single operation the steps of corrugating the medium, applying adhesives to the flutes thereof, and assembling the so-prepared medium with liner. Hot pressing of the so-assembled fiberboard is usually also accomplished in the same machine. Although the process embodiment of FIG. 2 discloses initially curing only the adhesive, it will be appreciated that it is convenient to practice the invention by curing both the adhesive and the resin for treatment of medium and liner members before making carton blanks from the fiberboard.

Those skilled in the art will appreciate that the type of corrugated fiberboard shown in FIGS. 1 and 2 is known to the trade as double-faced corrugated fiberboard since a medium liner is combined with a so-called inner and so-called outer liner.

Single-faced corrugated fiberboard is made by using a single corrugated medium member and single liner member; double-wall corrugated fiberboard comprises three liners with two corrugated medium members alternatively spaced between the liners; and triple-wall corrugated fiberboard comprises seven thicknesses and is made by bonding two single-faced boards into a double-faced board in which there are four liners and three corrugated medium members. All such corrugated fiberboard constructions are within the contemplation of the present invention.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

The following examples illustrate resin systems and adhesives suitable for use in making products of this invention.

Example A

An aqueous aminoplast modified phenol-aldehyde resin is made according to the teachings of example II of U.S. Pat. No. 3,004,941. The aminoplast is dicyandiamide. In the resin is dissolved 4 weight percent of ammonium chloride (based on total resin solids).

Example B

An aqueous aminoplast modified phenol-aldehyde resin is made according to the teachings of example II, Part B of U.S. Pat. No. 3,331,885. The aminoplast is melamine. In this resin is dissolved 3 weight percent of ammonium chloride (based on total resin solids).

Example C

An aqueous aminoplast modified phenol-aldehyde resin is made according to the teachings of example II, U.S. Pat. No. 3,444,119. The aminoplast is urea and dicyandiamide. In this resin is dissolved 2 weight percent of ammonium chloride and 1 weight percent of ammonium sulfate (based on total resin solids).

Example D

An aqueous aminoplast modified formaldehyde resin is made as follows:

In a reaction kettle is placed 200 parts by weight of 50 weight percent formalin. To the formalin is added 0.43 parts by weight glacial acetic acid solution. The resulting mixture is neutralized with 33 weight percent aqueous potassium hydroxide solution, and has a pH ranging from about 6.4 to 7.0. Next, to the mixture is added 100 parts by weight of crystalline urea and the mixture is heated to atmospheric reflux temperatures for about 2 hours. Thereafter, the mixture is cooled to 40° C. and neutralized with about a 33 weight percent potassium hydroxide solution to produce a product mixture having a pH of about 7.0 to 8.0. This product mixture is dehydrated under vacuum to the desired solids level (see below). The yield of urea-formaldehyde resinous product is about 225 weight percent (based on starting urea). This product urea-formaldehyde resin has the following characteristics:

| Total solids | 67–69% |
| --- | --- |
| Viscosity | 1,000–2,400 cps. |
| Free-formaldehyde (sodium sulfite method) | 3.0–6.0% |
| pH at 25° C. | 7.2–8.2 |
| Refractive index at 25° C. | 1.4900–1.4950 |
| Water dilutability | 750 to 1 |
| Total nitrogen content | 18–24% |

To prepare an aminoplast modified resin, 100 parts of the above resin are mixed with 100 parts of the phenol-formaldehyde resole resin prepared in example F (below).

Example E

A resorcinol-starch-formaldehyde adhesive system for use in this invention is prepared as follows:

To 125 gallons of water is added 142 pounds of a commercially available resorcinol-starch-mixture (from Penick and Ford under the trade designation Douglas Waterproof Corrugating Adhesive No. 7) and 150 pounds of corn starch.

The resulting mixture is heated to from about 140° to 145° F. for 10 minutes at which time there is added thereto additionally 10 gallons of water and 20 pounds of caustic (sodium hydroxide). This last mixture is agitated for an additional 10 minutes thereafter at an elevated temperature of about 140° F. Finally, to the resulting mixture is added an additional 80 gallons of water. The product constitutes what can be termed the primary mixture, or carrier portion, of the adhesive system.

Next is prepared the secondary mixture or raw starch portion, as follows:

To 250 gallons water is added 1,000 pounds of corn starch and 68 pounds of 37 percent aqueous formaldehyde. The composition is mixed at room temperature.

Finally, the primary mixture and the secondary mixture are admixed together and stirred for about 1 hour. The product is an adhesive system ready for use. This adhesive system has a total resorcinol to total starch weight ratio (based on total adhesive system solids) of from about 1 to 7, and it contains about 1.0 weight percent (based on total adhesive system solids) of combined formaldehyde, as well as about 70 weight percent (based on total adhesive system solids) of starch. It has a total adhesive solids content of about 25 weight percent, a viscosity of about 1,000 centipoises and a gel point of about 150° F. determined by heating the adhesive in a water bath heated gradually to the gel temperature.

Example F

A phenol-formaldehyde-starch adhesive system for use in this invention is prepared as follows:

To 16 weight parts of water is added 5 parts of the phenol-formaldehyde resin prepared as below described, 2.1 parts of a 23 percent caustic (sodium hydroxide) solution, and 4.4 parts of corn starch.

The resulting mixture is heated to 155°–165° F. with continuous mixing and mixed an additional 10–20 minutes at 155°–165° F. Finally, 13 parts of cooling water is added to the mixture. This product constitutes what can be termed the primary mixture, or carrier portion, of the adhesive system.

Next is prepared the secondary mixture or raw starch portion, as follows:

To 41 parts water is added 18 parts corn starch. The composition is mixed at room temperature.

Finally, the primary mixture and the secondary mixture are admixed together and stirred for about 1 hour. The product is an adhesive system ready for use. The adhesive system has a total phenolic resin to total starch weight ratio (based on total adhesive system solids) of from about 1 to 8.6. It has a total adhesive solids content of about 25 percent, a viscosity of about 800 cps., and a gel point of about 148° F., as determined by heating the adhesive in a water bath heated gradually to the gel temperature.

The phenol-formaldehyde resole resin used in this example is prepared as follows:

To 100 parts of phenol in a reaction kettle are added first 180 parts of 50 percent formalin and then 4 parts of sodium hydroxide sufficient to bring the pH to about 8.6. The mixture is refluxed for about 3 hours at about 65° C., while maintaining a reaction pH of about 8.6. Thereafter, this mixture is cooled to about 40° C. This mixture is then neutralized to a pH of about 7.0 with aqueous diluted hydrochloric acid. The resulting mixture is dehydrated under vacuum to the desired solids level (see table A below). The product yield is about 270 weight percent based on starting phenol. The product has a water solubility such that a 55 weight percent aqueous solution of resole resin solids can be prepared. The resin characteristics are summarized in table A below.

Example G

A urea-starch-formaldehyde adhesive system for use in this invention is prepared as follows:

234 Pounds of carrier starch are heated at 180° F. in 84 gallons of water, cooled to 140° F. and 126 gallons of water added. 468 Pounds of raw corn starch are then added and mixed to form a uniform dispersion. The pH is adjusted to 7–8 weith sodium carbonate. When the temperature drops to about 90° F., 160 pounds of the water soluble urea-formaldehyde resin of example D are added and mixed. Immediately prior to use the pH is adjusted to about 5.5 with an acid salt, ammonium chloride.

The product adhesive has a total solids content of about 32 weight percent (starch plus urea-formaldehyde resin) and it contains about 15 percent urea-formaldehyde resin solids based on total solids.

Example H

An aminoplast modified phenol-formaldehyde-starch adhesive system for use in this invention is prepared using the procedure of example F (above) but substituting for the resole resin then used the aminoplast modified resin of example A (above).

The following examples illustrate the manufacture of corrugated fiberboard of the present invention using the above-described resole resins and adhesive systems.

Example 1

Each side of a 26 pound basis weight medium paper sheet about 0.009 inch thick are roller coated with aminoplast modified phenol-aldehyde resin system of example H to a total resins content of about 8 weight percent based on the dry weight of the sheet plus resin. One side of a 42 pound basis weight Kraft liner paper sheet about 0.009 inch thick is roller coated with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next a medium sheet is corrugated into Type B flutes of about 50 per foot, and the resorcinol-formaldehyde-starch adhesive of example E is applied to the tips of the flutes of the medium corrugations at the rate of about 4 pounds per 1,000 ft.$^2$ of product fiberboard. The medium is then combined with two pieces of such liner sheet, one on each side of the adhesive treated medium sheet so as to form a corrugated fiberboard. This board is now exposed to a temperature of about 350° F. for about 2 seconds to dry and thermoset the adhesive. The product is an example of a corrugated fiberboard of this invention. A portion of this product is now exposed to 180° C. for 4 minutes to thermoset resin; this product is another example of a corrugated fiberboard of this invention.

Each such fiberboard product is now cut, scored, slotted, and formed into a box blank, after which the blank prepared from the first made fiberboard is subjected to a temperature of about 400° F. for about 2 minutes to thermoset the resin.

A container is assembled from a blank made with above made resin cured fiberboard and one is made from a blank made with above made nonresin cured fiberboard. The containers are compression tested for strength (top to bottom) ASTM Test Procedure D–642–47. The conditions and results are listed in table 1.

TABLE 1

| Condition | Container Strength Untreated | Treated |
|---|---|---|
| (a) 50% relative humidity/24 hrs. at 72° F. | 600 pounds | 250 pounds |
| (b) 95% relative humidity/24 hrs. at 72° F. | 220 pounds | 610 pounds |
| (c) in water for 24 hours | 10 pounds | 265 pounds |

Example 2

Using the procedure of example 1, but employing a container assembled from board made in accordance with as the medium a 33 pound basis weight 0.009 inch thick having a 10 weight percent resin content and a 5–8 percent volatiles content, and employing as the liner a 69 pound basis weight paper (thickness) having a 5 weight percent resin content and a 5–8 percent volatiles content, similar blanks and containers are made and compression tested (top to bottom). The corrugated medium has Type C flutes of about 40 per foot. The conditions and results are listed in table II.

TABLE 2

| Condition | Container Strength Untreated | Treated |
|---|---|---|
| (a) 50% relative humidity/24 hrs. at 72° F. | 1,200 pounds | 1,250 pounds |
| (b) 95% relative humidity/24 hrs. at 72° F. | 590 pounds | 750 pounds |
| (c) in water for 24 hrs. | nil | 300 pounds |

Example 3

A 33 pound basis weight 0.009 inch thick medium sheet is immersed in a solution of resin of example B and dried. The corrugated medium has Type C flutes of about 40 per foot. The product sheet has a total resin content of 10 weight percent based on the weight of the sheet plus resin and a volatiles content of 5–8 percent. After corrugation, a resorcinol-formaldehyde-starch adhesive system of example E is applied to the tips of the corrugations and then combined with untreated 42 pound basis weight Kraft liner paper sheets 0.009 inch thick to form corrugated fiberboard which is then heated to 340° F. for 3 seconds. The product board is scored, die cut, slotted, and then heated in a forced draft oven for 2 minutes at 400° F. to cure the resin. Another board is made as above, except that the porous medium paper sheet is not treated with resin. The two boards are tested for flat crush strength (ASTM Test Procedure D–1225–54). The conditions and results are listed in table 3.

TABLE 3

| Condition | Board Strength Treated | Untreated |
|---|---|---|
| (a) 50% relative humidity/24 hrs. at 72° F. | 600 pounds | 490 pounds |
| (b) 90% relative humidity/24 hrs. at 72° F. | 660 pounds | 300 pounds |
| (c) in water for 24 hours | 525 pounds | nil |

The above example clearly shows the superiority in wet strength of boxboard and containers made in accordance with this invention over those commercially available.

Examples 4–6

Using the procedure of example 1, additional corrugated boxboards are made. In each instance, the medium, the liner, the treating resin, and the adhesive are as indicated in table 4 below. In each instance, the product corrugated fiberboard displays excellent resistance to deterioration in strength in the presence of moisture of water using ASTM Test Procedure D–1225–54.

Similarly, each of the corrugated fiberboard constructions of this invention made in the foregoing examples 1–3 when similarly tested likewise display excellent resistance to deterioration and strength when in the presence of moisture as determined by ASTM Test Procedure 1225–54.

TABLE 4

| Ex. No. | Medium[1] Thickness | Grade weight | Liner Thickness | Grade weight | Ex. No. | Treating resin system Amount in medium percent resin | Percent vol. | Amount in liner percent resin | Percent vol. | Ex. No. | Adhesive amount applied[2] |
|---|---|---|---|---|---|---|---|---|---|---|---|
| 4 | .009 | 26 | 15 | 62 | A | 12 | 8 | 3 | 5 | G | 4 |
| 5 | .009 | 33 | 15 | 62 | B | 10 | 6 | 7 | 8 | E | 4 |
| 6 | .009 | 33 | 15 | 62 | C | 12 | 7 | --- | --- | F | 4 |
| 7 | .009 | 26 | 15 | 62 | A | 12 | 8 | 3 | 5 | H | 4 |

[1] Flutes in corrugated medium are Type B (about 50 per foot.)
[2] Lbs./1000 ft.[2] of product board.

What is claimed is:

1. An intermediate sheet member adapted for use in the manufacture of rigid-when-wet corrugated fiberboard comprising:
   A. a cellulosic paper sheet ranging in thickness from about 5 to 20 thousandths of an inch and having a grade weight of from about 25 to 120 pounds per 1,000 sq. ft.,
   B. said paper containing from about 5 to 15 weight percent (dry weight basis) with an aminoplast modified phenol-aldehyde resin system and said treated paper having a total volatiles content of from about 3 to 10 weight percent,
   C. said modified phenol-aldehyde resin system comprising (on a dry total weight basis) from about 95 to 99.5 weight percent of an aminoplast modified phenol-aldehyde resole resin which is initially substantially completely soluble in water, and, correspondingly, from 0.5 to 5 weight percent of an ammonium salt of a mineral acid.

2. A corrugated fiberboard construction adapted to be rigid when wet comprising:
   A. as a medium, a corrugated sheet member of claim 1 having a thickness of from about 7 to 15 thousandths of an inch and a grade weight of from about 25 to 36 pounds per 1,000 sq. ft.,
   B. as a liner, a sheet member having a thickness of from about 5 to 20 thousandths of an inch and having a grade weight of from about 33 to 120 pounds per 1,000 sq. ft.,
   C. as an adhesive, a bonding composition selected from the group consisting of phenol-starch-formaldehyde adhesives, resorcinol-starch-formaldehyde adhesives, urea-starch-formaldehyde adhesives, and aminoplast modified phenol-formaldehyde starch adhesives and having a cure time which is not less than about 15 seconds at 170° C.,
   E. said corrugated medium sheet member being positioned adjacent said liner sheet member and being bonded thereto at positions of mutual contact therebetween by said adhesive, and
   F. such resulting construction having been subjected to a temperature of from about 320° F. to 450° F. for, inversely, a time of from about 0.5 seconds to 10 minutes.

3. The fiberboard construction of claim 2 wherein said liner is a sheet member of claim 1.

4. A box blank prepared from a corrugated fiberboard construction of claim 2.

5. A box blank prepared from a corrugated fiberboard construction of claim 3.